Patented Sept. 8, 1925.

1,552,830

UNITED STATES PATENT OFFICE.

ALBERT ERNEST DUNSTAN, OF SUNBURY ON THAMES, ENGLAND.

REFINING OF LIQUID HYDROCARBONS.

No Drawing. Application filed March 20, 1922. Serial No. 545,356.

*To all whom it may concern:*

Be it known that I, ALBERT ERNEST DUNSTAN, a subject of the King of Great Britain and Ireland, residing at Meadhurst, 5 Cadbury Road, Sunbury on Thames, England, have invented certain new and useful Improvements Relating to the Refining of Liquid Hydrocarbons, of which the following is a specification.

This invention relates to the refining of liquid hydrocarbons and is applicable to the refining of benzine, kerosene or other distillates from petroleum, shale oil and the like by the removal therefrom of sulphur compounds.

It is known to refine liquid hydrocarbons for the removal of sulphur therefrom by an oxidizing treatment consisting in the admixture of a solution of a hypochlorite such as sodium hypochlorite whereby sulphur compounds contained in the liquid hydrocarbon are oxidized and bodies produced that readily pass into and are removed with the lye. I have found that this treatment results in a change in the character of the remaining sulphur content not readily removable by further treatment with alkaline hypochlorite solutions.

The present invention has among its objects to remove part of the remaining sulphur content after treatment with alkaline hypochlorite solutions.

According to the invention the liquid hydrocarbon after first being treated with an alkaline aqueous hypochlorite solution is treated with an aqueous solution of caustic alkali whereby the sulphur content is materially reduced.

Furthermore according to the invention the liquid hydrocarbon before being subjected to treatment with an alkaline aqueous hypochlorite solution is treated with an aqueous solution of alkali by which the sulphur content is reduced and thus the amount of the sulphur content to be removed by the hypochlorite treatment is also reduced, and any bodies possessing an acid reaction are removed. Thus by this preliminary treatment the hypochlorite is protected from decomposition and notable economy effected in the use of this re-agent. Moreover the removal of such acidic bodies tends to prevent the subsequent formation of chlorinated derivatives of the petroleum hydrocarbons.

In carrying the invention into effect the preliminary treatment may be effected with .5 to .75 per cent of caustic alkali made up to a 10 per cent solution in water. After agitation of the said solution with the liquid hydrocarbon to be treated, over a period of one hour, or more or less, according to the sulphur content in the liquid hydrocarbon to be treated, the solution of caustic alkali is separated from the liquid hydrocarbon and the liquid hydrocarbon is then subjected to treatment with an alkaline hypochlorite solution such as a solution of sodium hypochlorite in water.

The treatment may be effected within the vessel in which the solution of salt such as brine is electrolyzed for the production of the hypochlorite or the treatment may be effected within a mixing apparatus external to the electrolytic apparatus. Heat may be applied to the vessel in which the treatment is effected so that the liquid is maintained at a temperature of for example 120° F., which has been found effective, and the liquids thoroughly agitated. Quite satisfactory results, however, are obtained at the ordinary atmospheric temperatures. The hypochlorite treatment is effected in the presence of free alkali so as thus to inhibit chlorination of the hydrocarbons and to stabilize the hypochlorite and to assist in the removal of the products of the treatment which result mainly from the oxidation of the sulphur compounds originally present in the liquid hydrocarbon treated. After treatment with the alkaline hypochlorite solution the liquid hydrocarbon is subjected to a further washing with caustic alkali. For this purpose an aqueous solution of caustic soda may be used, whereby the remaining content of sulphur compounds are further reduced. This treatment may continue under agitation, for example for a period of one hour, and the solution of caustic soda may be used for the preliminary treatment of another batch of the liquid hydrocarbon.

The soda for the preliminary soda wash may be recovered by steaming off from it an oil rich in sulphur, the residual soda being then available for use. Such recovery may proceed until one batch of soda has been used for ten successive washings.

It will be understood that the invention is not limited as to the apparatus used for carrying out the steps involved in the treatment according to the invention, as any vessel ensuring intimate admixture and contact of the liquid hydrocarbon with the re-agent used may be employed.

In carrying the invention into effect according to one example crude oil having a high sulphur content (viz 1.1 per cent) was distilled and the distillate amounting to 35 per cent of the crude oil was then subjected to a preliminary soda wash. The product of this preliminary treatment was then subjected to treatment with an alkaline hypochlorite solution in two separate stages and the product of this treatment was then subjected to further washing with a caustic soda solution. The product was then distilled for the production of a gasoline distillate and a kerosene residue, and the content of sulphur in the gasoline distillate was ascertained to be only .007 per cent. No limitation is, however, involved to repeated treatment with alkaline hypochlorite solutions. Practically complete elimination of sulphur has been effected by such a treatment involving only one washing with an alkaline hypochlorite solution in the manner hereinbefore described. The duration of the treatment with hypochlorite will depend upon the content of sulphur, upon the thoroughness of agitation and upon the temperature as well as upon the concentration of the hypochlorite.

The oil to be treated should be analyzed so as to discover its sulphur content. For each unit amount of sulphur there should be provided at least one unit amount of oxygen resulting from the decomposition of hypochlorite. The amount of free alkali should at least be of the order of 0.1 per cent concentration. The concentration of the hypochlorite should be at least 0.25 normal and the current density in the electrodes may be from .15 to .4 amperes per square centimetre. The duration of treatment should be determined by test with each individual oil.

In cases where the oxidized sulphur compounds are of high molecular weight and are relatively insoluble in alkali, they may be removed from solution in the refined oil by means of filtration through animal charcoal, dehydrated alumina, fuller's earth or any suitable adsorbent agent.

I claim:

In a method of refining liquid hydrocarbons which comprises subjecting the liquid hydrocarbons to treatment with an alkaline hypochlorite solution followed by treatment with a caustic alkali solution, washing another batch of hydrocarbons prior to treatment with hypochlorite solution with the residual solution of caustic alkali.

ALBERT ERNEST DUNSTAN.